Figure 1:
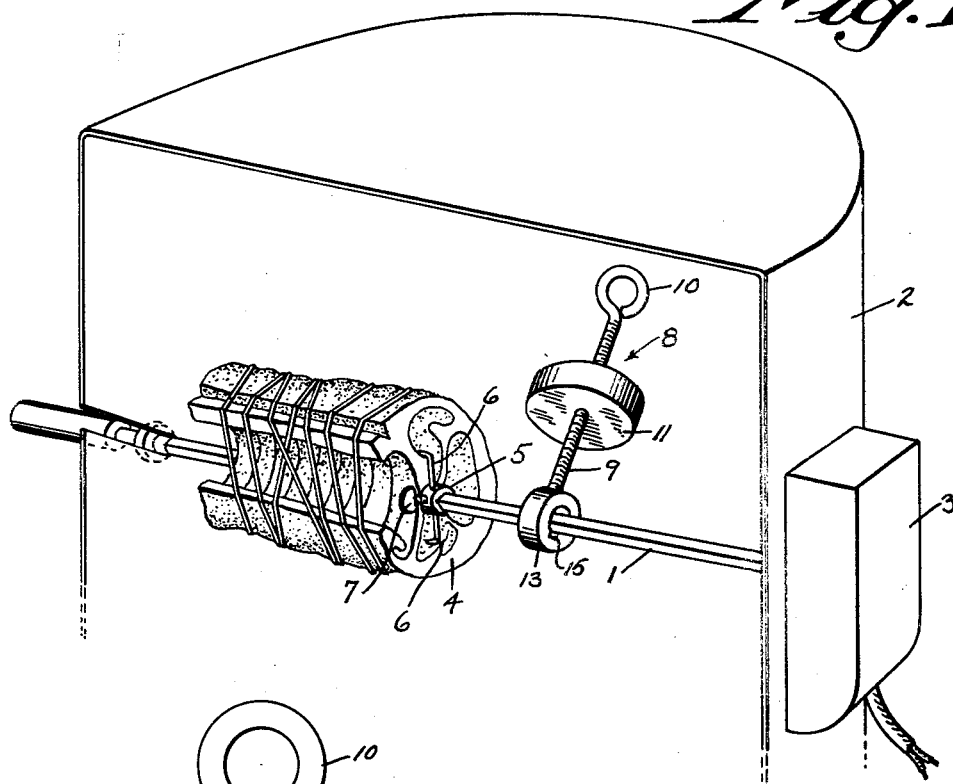

Aug. 4, 1964     L. J. SCHMITT     3,143,003
COUNTERBALANCE FOR ROTARY SPIT
Filed March 3, 1961

INVENTOR
LEO J. SCHMITT

BY Allan W. Leiser

ATTORNEY

United States Patent Office 3,143,003
Patented Aug. 4, 1964

3,143,003
COUNTERBALANCE FOR ROTARY SPIT
Leo J. Schmitt, Aniwa, Wis.
Filed Mar. 3, 1961, Ser. No. 93,180
2 Claims. (Cl. 74—573)

This invention relates to a counterbalance for a rotary spit, and specifically resides in a counterbalance comprised of a ring-like retaining member adapted to be mounted on a spit, a shaft secured at one end to the retaining member, and a weight mounted on said shaft and movable longitudinally thereon whereby the eccentric mounting of an object upon the spit may be compensated for by mounting the counterbalance at a proper circumferential position on the spit and adjusting the radial psitions of the weight relative to the spit.

Outdoor and indoor broiling and roasting units are generally provided with rotatable spits which are driven by small electric motors. The meat, fowl or other food which it is desired to roast may be affixed to such spit by forcing one end of the spit through the edible. Since such edibles are rarely of a uniform size or configuration, unless extreme care is exercised in positioning the spit through the edible the rotation of the spit will be uneven due to the eccentric weight thereon. Not only will this result in non-uniform roasting, but will cause unnecessary wear on the driving motor and may result in complete failure of the motor.

The proper positioning of the spit through the meat, fowl or other edible would eliminate the problem of uneven rotation, but this is not always practical. Thus, considerable trial and error is necessary to find the center of gravity of the edible and in so doing the meaty portion thereof may be damaged. Furthermore, the center of gravity may not occur at the strongest portion of the edible which can result in insecure mounting of the edible.

A second common method of mounting the edible on the spit consists of enclosing the edible in a wire basket which is then attached to the spit. Such baskets are generally secured to the spit in such a manner that one side of the basket lies along the spit. It will be apparent that the use of such a roasting basket will always result in an eccentric load on the spit regardless of the care exercised in the placement of the edible.

The counterbalance of the present invention eliminates the undesirable effects of eccentric mounting of an edible, whether mounted directly on the spit or in a basket, by providing an adjustable counterbalance which is mountable upon the spit and adjustable to provide the proper amount and position of weight to offset the eccentric load. When the counterbalance is used, the meat or food may be secured upon the spit at any desirable location, such as adjacent a bone portion, for the greatest strength and least damage to the fleshy portion. Likewise, the edible may be indiscriminately arranged within a roasting basket if used. The counterbalance may then be slipped onto the spit and positioned to offset any eccentricity in the weight of the edible. The counterbalance may be easily cleaned to remove deposits which may accumulate during roasting since it is readily removable from the spit.

By providing complete balance to the loads on the spit under all conditions of use and for any type of meat, fowl and the like, an even rotation results which produces better roasting and less wear on the spit motor.

It is, therefore, an object of this invention to provide a counterbalance for rotary spits to compensate for eccentric mounting of edibles upon the spit to insure even rotation thereof.

It is a further object of this invention to provide a rotary spit counterbalance of separable easily cleaned components adapted to be adjustably and removably mounted upon the spit and which may include a plurality of radially adjustable weights.

It is also an object of this invention to provide a counterbalance for a motor driven rotatable spit which includes a threaded shaft adapted for adjustably mounting balancing weights and for securing the counterbalance to the spit.

The foregoing and other objects and advantages will appear from the following description. In the description to follow, reference is made to the accompanying drawing which forms a part hereof and in which there is shown by way of illustration only a specific embodiment of this invention.

Figure 2:
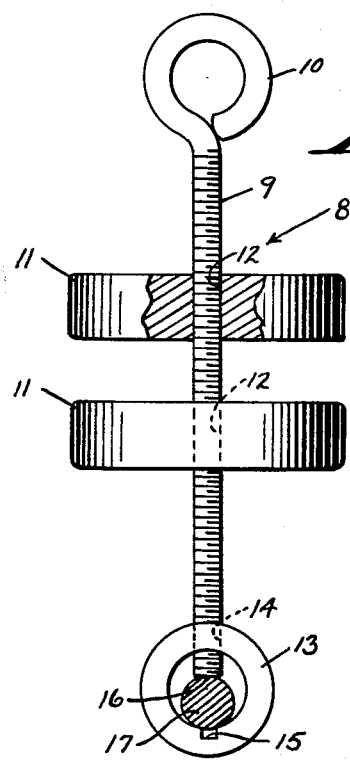

In the drawing:

FIG. 1 is a view in perspective of a portion of a motor driven rotatable spit roasting unit showing an edible and the counterbalance mounted thereon, and FIG. 2 is a plan view of the counterbalance having two adjustable weights with a portion of one weight broken away for clarity only.

Referring now to the drawing and specifically to FIG. 1, there is shown therein a portion of a conventional outdoor broiling and roasting unit which includes a rotatable spit 1 journaled at opposite ends in suitable openings provided within opposite side surefaces of a hood 2. One end of the spit 1 is operatively connected to a low speed electric motor 3 mounted on the exterior of the hood 2. An edible may be mounted upon the spit 1 by being secured thereby and may take the form of a roast 4. The spit 1 and attached roast 4 are rotated for uniform heat application by the motor 3. To prevent the independent rotation of the roast 4 relative to the spit 1, a collar 5 having prongs 6 which extend into the roast 4 is secured to the spit 1 by means of a screw 7.

In the absence of the counterbalance of this invention, and without exact positioning of the roast 4 on the spit 1, an eccentric load will result. Such eccentric load will produce uneven rotation of the spit 1 upon being driven by the motor 3, since such motors are generally incapable of restraining the alternating acceleration and deceleration resulting from the eccentric load. To prevent such uneven rotation, a counterbalance 8 is suitably attached and positioned upon the spit 1.

The counterbalance 8 includes a threaded shaft 9 which may be provided at one end with a screw-eye portion 10 for ease in grasping the shaft 9 during mounting of the counterbalance 8 (see FIG. 2). One or more preferably disc-shaped weights 11 are each provided with a threaded center hole 12 whereby the weights 11 may be mounted in threaded engagement upon the shaft 9 for individual longitudinal movement thereon. A ring-like retaining member 13 is provided with a threaded opening 14 which extends radially through one side of the member 13 and which is adapted to receive one end of the shaft 9. The retaining member 13 may be provided with a notch 15 extending into the inner surface of the member 13 opposite the threaded opening 14.

When it is desired to employ the counterbalance 8, the roast 4 may be mounted upon the spit 1 in a convenient location, by passing the spit 1 through the roast 4 at a point of maximum strength, such as adjacent a bone portion. The counterbalance 8 is slipped onto the spit 1 by passing the spit 1 through the retaining member 13. Once the location of the eccentricity has been determined, the counterbalance is affixed to the split 1 in a balancing position by gripping the spit 1 between the inner surface of the retaining member 13 and a bearing end 16 of the shaft 9 by screwing the shaft 9 through the retaining member 13.

The cooperating retaining member 13 and bearing end 16 of the shaft 9 are adapted to grip spits of various cross sections. Thus, FIG. 1 shows a spit 1 having a rectangular cross section and FIG. 2 shows a spit 17 having a circular cross section. In each case, a three point contact is achieved with the edges of the inner surface of the member 13 defined by the slot 15 providing two such points and the bearing end 16 of the shaft 9 providing the remaining point of contact. The screw-eye portion 10 of the shaft 9 provides a convenient hand grip for tightening the shaft 9.

The balancing effect of the counterbalance may be adjusted by moving the weights 11 radially inwardly or outwardly to the extent necessary to provide a completely balanced load upon the spit 1.

In a similar manner, the counterbalance 8 may be positioned circumferentially on the spit 1 and the weights 11 adjusted radially to offset the eccentricity produced by the use of a roasting basket (not shown).

After the counterbalance 8 has performed its function, the same may be easily removed for cleaning away any accumulated juices and the like. To permit simple cleaning and to prevent corrosion of the counterbalance 8, the counterbalance 8 is preferably formed of stainless steel alloys or suitably plated with a corrosive resistant material such as chromium.

Any number of weights 11 may be added to the shaft 9 consistent with the weight to be balanced, and the retaining member 13 may be provided with a plurality of circumferentially spaced holes 14 so that additional shafts 9 and attached weights 11 may be mounted thereon, if necessary.

Other common methods of adjustably mounting the weights 11 upon the shaft 9 are possible, as are common alternative methods of securing the retaining member 13 to the spit 1 and shaft 9.

It will be apparent from the foregoing that the counterbalance of this invention provides a simple, convenient means for insuring even rotation of a spit with resulting improvements in roasting and reduced wear on the driving motor. The shaft 9 performs the dual function of adjustably mounting the counterbalancing weights 11 and mounting the counterbalance on a rotary spit, thereby permitting easy mounting and removal of the counterbalance.

I claim:
1. An adjustable apparatus for counterbalancing an object mounted eccentric of a rotatably driven spit comprising a ring-like retaining member adapted to surround said spit and including a radially aligned threaded opening in one side thereof, a threaded shaft received within said opening having one end adapted to bear against said spit to grip the spit between said end of the shaft and the inner surface of the retaining member, and a weight in threaded engagement upon said shaft and movable longitudinally thereon, whereby the position of the apparatus upon said spit may be varied circumferentially and the weight adjusted radially to provide a balanced load upon said spit.

2. An adjustable apparatus for counterbalancing an object mounted eccentric of a rotatably driven spit comprising a ring-like retaining member adapted to surround said spit and including a radially aligned threaded opening in one side thereof, a threaded shaft terminating at one end in a screw-eye portion and received within said opening adjacent a second end which is adapted to bear against the spit to grip the same between the second end and the inner surface of the retaining member, and a weight in threaded engagement upon said shaft and movable longitudinally thereon, whereby the position of the apparatus upon said spit may be varied circumferentially and the weight adjusted radially to provide a balanced load upon said spit.

References Cited in the file of this patent
UNITED STATES PATENTS

| | | |
|---|---|---|
| 131,782 | Randall | Oct. 1, 1872 |
| 525,799 | Rymes | Sept. 11, 1894 |
| 780,850 | Williams | Jan. 24, 1905 |
| 1,138,592 | Little | May 4, 1915 |
| 1,249,094 | Hughes | Dec. 4, 1917 |
| 1,276,807 | Pierman | Aug. 27, 1918 |
| 2,760,517 | Davis | Aug. 28, 1956 |
| 3,085,497 | Statia | Apr. 16, 1963 |